US012156126B2

(12) United States Patent
Lawal et al.

(10) Patent No.: US 12,156,126 B2
(45) Date of Patent: Nov. 26, 2024

(54) TOEPLITZ STRUCTURED SUBSPACE FOR MULTIPLE-CHANNEL BLIND IDENTIFICATION METHODS

(71) Applicant: KING FAHD UNIVERSITY OF PETROLEUM AND MINERALS, Dhahran (SA)

(72) Inventors: Abdulmajid Lawal, Dhahran (SA); Karim Abed-Meraim, Dhahran (SA); Qadri Mayyala, Dhahran (SA); Naveed Iqbal, Dhahran (SA); Azzedine Zerguine, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 9 days.

(21) Appl. No.: 18/299,460

(22) Filed: Apr. 12, 2023

(65) Prior Publication Data

US 2023/0328637 A1 Oct. 12, 2023

Related U.S. Application Data

(60) Provisional application No. 63/330,038, filed on Apr. 12, 2022.

(51) Int. Cl.
*H04W 48/16* (2009.01)
*H04B 7/0404* (2017.01)
*H04B 7/0413* (2017.01)

(52) U.S. Cl.
CPC ........ *H04W 48/16* (2013.01); *H04B 7/0404* (2013.01); *H04B 7/0413* (2013.01)

(58) Field of Classification Search
CPC ..................................................... H04W 48/16
USPC .......................................................... 375/267
See application file for complete search history.

(56) References Cited

U.S. PATENT DOCUMENTS

| 6,314,147 B1* | 11/2001 | Liang ................... H04B 7/0854 375/348 |
| 10,700,766 B2* | 6/2020 | Khandani .......... H04B 7/15557 |
| 11,184,783 B1* | 11/2021 | Melodia ................. G06N 3/084 |
| 2016/0295596 A1* | 10/2016 | Masmoudi ............. H04B 1/525 |
| 2017/0359581 A1* | 12/2017 | Rusanovskyy ........ H04N 19/12 |
| 2020/0204229 A1* | 6/2020 | Jin ....................... H04B 7/0469 |

(Continued)

OTHER PUBLICATIONS

Lawal et al. ; Blind Adaptive Channel Estimation using Structure Subspace Tracking ; 55 Asilomar Conference on Signals, Systems, and Computers ; Oct. 31, 2021-Nov. 3, 2021 ; 5 Pages.

(Continued)

*Primary Examiner* — Lihong Yu
(74) *Attorney, Agent, or Firm* — Oblon, McClelland, Maier & Neustadt, L.L.P.

(57) ABSTRACT

A method, non-transitory computer readable medium, and system for multiple-input multiple-output for blind identification that includes receiving an input signal, originated as an output signal of a transmitter, at a receiver. A signal processing module can obtain the input signal from the receiver. The signal processing module can use a finite impulse response filter and one or more matrices derived from the input signal to minimize a cost function and obtain a parameter matrix. The parameter matrix can then be used to estimate the output signal by generating one or more Toeplitz matrices using the parameter matrix.

7 Claims, 13 Drawing Sheets

(56) References Cited

U.S. PATENT DOCUMENTS

2021/0012204 A1* 1/2021 Kuwajima ............. G06N 3/084
2021/0218478 A1 7/2021 Zhang et al.
2021/0385662 A1* 12/2021 Furuichi ............... H04W 72/23

OTHER PUBLICATIONS

Shin et al. ; Blind Channel Estimation for MIMO-OFDM Systems ; IEEE Transactions on Vehicular Technology, vol. 56, Issue 2 ; Mar. 26, 2007 ; 2 Pages ; Abstract Only.
Zarzoso et al. ; Blind Identification and Equalization of MIMO FIR Channels Based on Subspace Decomposition and Independent Component Analysis ; Proc. $2^{nd}$ IMA Intl. Conf. on Mathematics in Communications, Lancaster Univ. ; Dec. 16-18, 2002 ; 7 Pages.
Diamantaras et al. ; Blind identification of PAM-MIMO systems based on the distribution of output differences ; ResearchGate ; Jan. 2023 ; 6 Pages.

* cited by examiner

TOEPLITZ STRUCTURED SUBSPACE FOR MULTIPLE-CHANNEL BLIND IDENTIFICATION METHODS

CROSS REFERENCE TO RELATED APPLICATIONS

The present application claims the benefit of priority to U.S. Prov. App. No. 63/330,038, entitled "Toeplitz Structured Subspace For Multi-Channel Blind Identification Methods", filed on Apr. 12, 2022, and incorporated herein by reference in its entirety.

STATEMENT REGARDING PRIOR DISCLOSURE BY THE INVENTORS

Aspects of this technology are described in "Blind adaptive channel estimation using structure subspace tracking" 55th Asilomar Conference on Signals, Systems, and Computers, on Oct. 31, 2021, which is incorporated herein by reference in its entirety.

STATEMENT OF ACKNOWLEDGEMENT

The inventors acknowledge the financial support provided by provided by the Deanship of Scientific Research of King Fand University of Petroleum and Minerals (KFUPM), Riyadh, Saudi Arabia under Research Grant SB181001.

BACKGROUND

Technical Field

The present disclosure relates to a system and method for blind identification of multiple-input multiple-output (MIMO) systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Conventional system identification methods use a training sequence that is known to a receiver and is used both to acquire and update the channel. Such methods are simple, but lack efficiency due to the reduction in bandwidth and throughput. In addition, training sequences result in further difficulties for some real-time applications, such as in asynchronous wireless networks. As a result, system identification methods that do not use training sequences are preferred, and are referred to as blind system identification methods.

Blind system identification sees use in satellite communications, image processing, seismic explorations, and biomedical image processing in addition to other fields of research and technology. Methods for blind system identification can be further categorized into higher-order statistics methods, such as constant modulus algorithms, and second-order statistic methods, such as the standard subspace method, cross relation method, linear prediction method, two step maximum likelihood method, truncated transfer matrix method, or a structured channel space method. Some of these blind system identification methods can be applied to single-input multiple-output (SIMO) systems and/or to MIMO systems.

The above mentioned blind system identifications have several downfalls. Cross relation is cheap in computational complexity but has reduced performance in adverse scenarios as compared to the other methods. Linear prediction and truncated transfer matrix can be implemented adaptively and are robust to channel order estimation errors break down under noisy channel conditions or when using small sample sizes. Two step maximum likelihood and subspace methods can achieve better performance in the presence of noise and can be implemented adaptively but have high computational complexity.

Accordingly, it is one object of the present disclosure to provide improved methods and systems for blind system identification of MIMO systems.

SUMMARY

In an exemplary embodiment a system for blind estimation of multiple-input multiple-output systems is provided. The system includes a transmitter comprising a plurality of transmitter antennas, wherein each transmitter antenna is configured to transmit an output signal and a receiver comprising a plurality of receiver antennas, wherein each receiver antenna is configured to receive an input signal. The system can also include a filtering module comprising a causal finite impulse response filter having a channel degree. The system may then include a signal processing module electronically coupled to the receiver and configured to estimate the output signal by generates one or more Toeplitz matrices by minimizing a cost function comprising the channel degree and one or more matrices derived from the input signal.

In another exemplary embodiment, a multiple-input multiple-output blind estimation method performed by a signal processing module includes receiving, from a receiver comprising a plurality of receiver antennas, an input signal from each receiver antenna, wherein the input signal corresponds to an output signal that is transmitted from a plurality of transmitter antennas of a transmitter. The method then includes minimizing a cost function comprising a channel degree of a casual finite impulse response filter and one or more matrices derived from the input signal to obtain a parameter matrix. The method can then estimate the output signal by generating one or more Toeplitz matrices using the parameter matrix.

In another exemplary embodiment, a non-transitory computer readable medium having instructions stored therein that, when executed by one or more processors, cause the one or more processors to perform a method including: receiving, from a receiver comprising a plurality of receiver antennas, an input signal from each receiver antenna, wherein the input signal corresponds to an output signal that is transmitted from a plurality of transmitter antennas of a transmitter; minimizing a cost function comprising a channel degree of a casual finite impulse response filter and one or more matrices derived from the input signal to obtain a parameter matrix; and estimating the output signal by generating one or more Toeplitz matrices using the parameter matrix.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
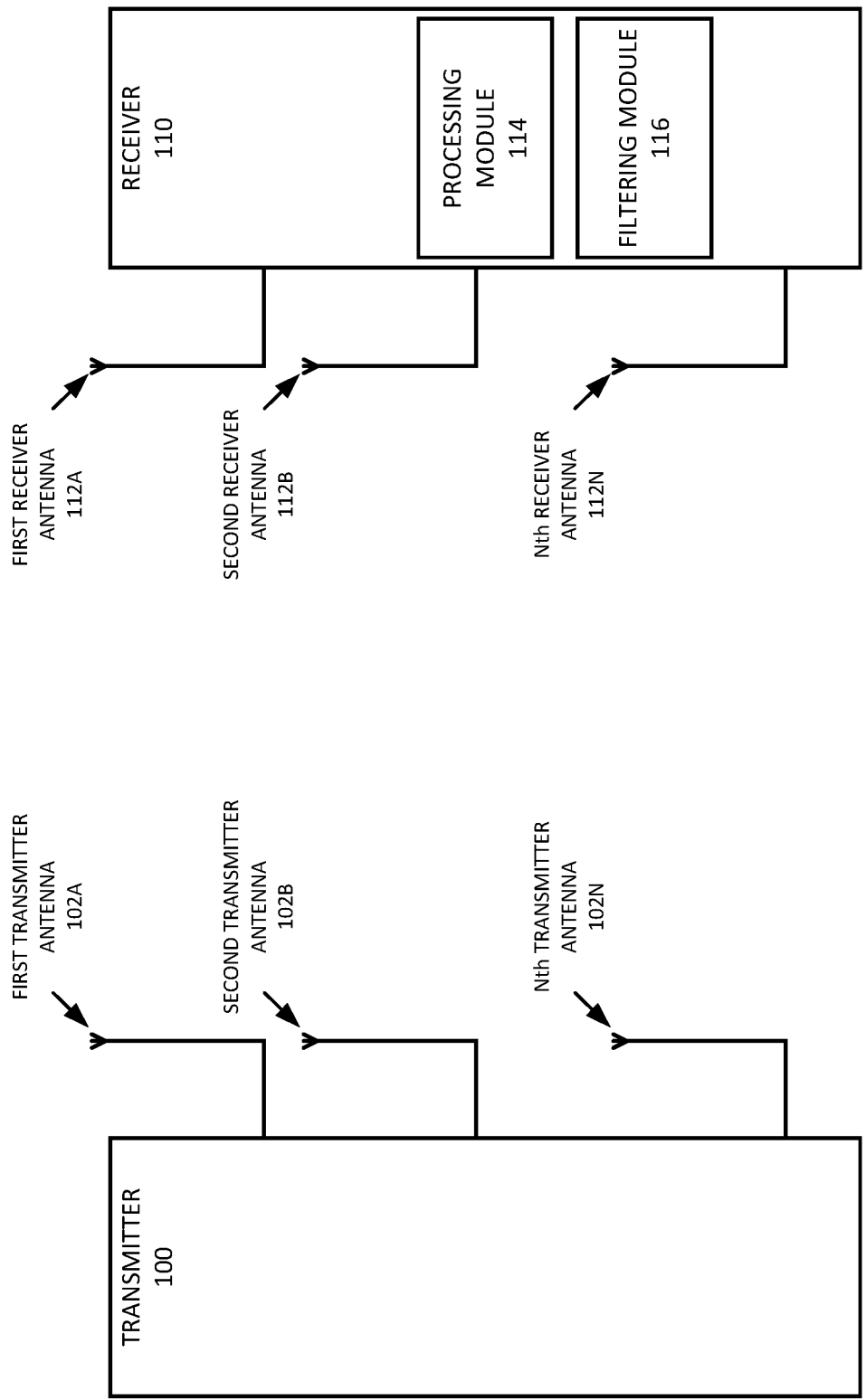
FIG. 1 shows a block diagram of a multiple-input multiple-output system according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, device, and method for blind system identification of multiple-input multiple-output (MIMO) systems. Embodiments exploit the Toeplitz structure of a channel matrix and creates a cost function that represents a deviation of the Toeplitz channel matrix from a Sylvester structure. Embodiments minimize the cost function while enforcing the subspace information of the sample covariance matrix to estimate a channel. Embodiments provide for significant advantages when processing short data sequences using MIMO structured signal subspace methods. Such embodiments are particularly advantageous in wireless communication systems, where the environment is rapidly changing. Embodiments can be deployed in wireless communications for channel estimations. In one example, a communication device such as a mobile phone can use MIMO structured channel subspace channel estimation to estimate a communication channel. In other examples, embodiments can be used for seismology channel estimation.

FIG. 1 shows a block diagram of a multiple-input multiple-output system according to certain embodiments. The multiple-input multiple-output system can comprise a trans- mitter 100 and a receiver 110. The transmitter 100 can comprise a plurality of transmitter antennas, shown as a first transmitter antenna 102A, a second transmitter antenna 102B, and an n-th transmitter antenna 102N. The receiver 110 can comprise a plurality of receiver antennas, shown as a first receiver antenna 112A, a second receiver antenna 112B, an n-th transmitter antenna 112N, a processing module 114, and a filtering module 116. Although the transmitter 100 and the receiver 110 are shown to have three antennas in FIG. 1, the transmitter 100 and/or the receiver 110 can comprise any suitable number of transmitter antennas, such as 2, 4, 8, 16, 32, 64, 128, or 256.

The processing module 114 can be electronically coupled to the receiver 110. In some embodiments, the processing module 114 can be configured to perform methods described herein. For example, the processing module 114 can obtain data of input signals received at the receiver antennas and perform a MIMO structured channel subspace channel estimation to estimate a communication channel. The filtering module 116 can comprise a causal finite impulse response (FIR) filter. The casual FIR filter can be configured with a tap coefficient for each of the input delay lines. The tap coefficients can be estimated by the processing module 114 upon minimization of the cost function when performing channel estimations. The tap coefficients can then applied to the FIR filter to obtain filtered signal output values/

FIG. 1 can implement a spatio-temporal MIMO system, where y(t) denotes an output signal vector, H(k) denotes the k-th channel matrix tap, s(t−k) represents an input signal vector, $N_t$ is the number of transmitter antennas, $N_r$ is the number of receiver antennas such that $N_r > N_t$, and L is a finite impulse response (FIR) channel degree. The noisy model of such a system can be represented by equation (1) below:

$$y(t) = \sum_{k=0}^{L} H(k)s(t-k) + b(t) \quad t=0, \ldots, N-1 \quad (1)$$

where N is the total sample size (e.g., the total time considered), $y(t)=[y_1(t) \ldots y_{N_r}(t)]^T$ where t is time, $s(t-k)=[s_1(t) \ldots s_{N_t}(t)]^T$, $b(t)=[b_1(t) \ldots b_{N_r}(t)]^T$ is an additive spatio-temporal white noise of power $\sigma_b^2 I_{N_r}$ that is independent of the transmitted signals and k is a delay in time (e.g., measuring the effect of convolution), and $$H(k) = \begin{bmatrix} h_{11}(k) & \cdots & h_{1N_t}(k) \\ \vdots & \ddots & \vdots \\ h_{N_r1}(k) & \cdots & h_{N_rN_t}(k) \end{bmatrix}.$$

An unknown $N_r \times N_t$ causal FIR filter has a transfer function $\mathcal{H}(z) = \sum_{k=0}^{L} H(k)z^{-k}$ is assumed to be irreducible (i.e., $\mathcal{H}(z) \neq 0$ for $\forall z$, where z is the z-transform of the input signal). If a total of $N_w$ samples are stacked successively into a single vector, then an $M=N_w N_r$ dimensional vector shown by equations (2), (3), and (4) below:

$$y_{N_w}(t) = [y^T(t) y^T(t-1) \ldots y^T(t-N_w+1)]^T \quad (2)$$

$$y_{N_w}(t) = H_{N_w} s_k(t) + b_{N_w}(t) \quad (3)$$

$$H_{N_w} = \begin{bmatrix} H(0) & \cdots & H(L) & \cdots & 0 \\ \vdots & \ddots & & & \vdots \\ 0 & \cdots & H(0) & \cdots & H(L) \end{bmatrix} \quad (4)$$

where $s_k(t)=[s^T(t) \, s^T(t-1) \ldots s^T(t-K+1)]^T$, $K=N_w+L$, and $H_{N_w}$ is the convolution matrix. As a result, a data matrix Y can be defined by the below equations (5) and (6):

$$Y = [y_{N_w}^T(N_w - 1) \ldots y_{N_w}^T(N-1)]^T = H_{N_w}S_K + B_{N_w}(t) \quad (5)$$

$$S_K = \begin{bmatrix} s(N_w-1) & s(N_w) & \ldots & s(N-1) \\ s(N_w-2) & s(N_w-1) & \ldots & s(N-2) \\ \vdots & \vdots & \vdots & \vdots \\ s(-L) & s(-L+1) & \ldots & s(N-N_w-L) \end{bmatrix} \quad (6)$$

The matrix $S_K$ of dimension $N_t(N_w+L)\times(N-N_w+1)$ is a block Toeplitz matrix. The input signal subspace is spanned by the rows of $S_K$, while the channel subspace is spanned by the columns of $H_{N_w}$. It can be shown that $S_K$ is a full row rank and $H_{N_w}$ is full column rand under assumptions given in K. Abed-Meraim, et al., "A subspace algorithm for certain blind identification problems", *IEEE Trans. Inf. Theory* 43 (3) (1997) pp. 499-511 (incorporated herein by reference).

For SIMO signals, the total number of transmitter antennas is equal to one (i.e., $N_t=1$). This setting is described in Q. Mayyala, et al., "Structure-based Subspace Method for Multichannel Blind System Identification", *IEE SIGNAL PROCESS Lett.* 24 (8) (2017) pp. 1183-1187 (incorporated herein by reference). The SIMO structured channel subspace channel estimation described in Mayyala searches for the channel matrix $H_{N_w}$ in the form of $H_{N_w}=V_sQ$, where $V_s$ is a matrix of the K principal eigenvectors of the covariance matrix of $y_{N_w}(t)$, and Q is chosen such that the resulting matrix has a block Toeplitz structure as seen in equation (4). To perform this search, a cost function $J=J_1+J_2+J_3$ consisting of three parts is minimized, the cost function described below by equation (7):

$$J=\Sigma_{j=1}^{K-1}\Sigma_{i=1}^{N_r(N_w-1)}|\hat{H}(i,j)-\hat{H}(i+N_r,j+1)|^2+\Sigma_{j=L+2}^{K}|\hat{H}(1:N_r,k)|^2+\Sigma_{i=N_r+1}^{N_rN_w}|\hat{H}(i,1)| \quad (7)$$

where $\hat{H}(i,j)$ denotes the entry at the $(i,j)$ position of $\hat{H}_{N_w}$ (the Toeplitz structured channel matrix). The first part of equation (7) forces the non-zero entries to have a block Toeplitz structure. The last two parts of equation (7) enforce zeroes that correspond to the first $N_r$ rows and the first column of $H_{N_w}$ respectively. Embodiments provide for a generalization of this approach for MIMO signals.

For MIMO signals, the total number of transmitter antennas is greater than one (i.e., $N_t>1$). Embodiments can provide for such MIMO structured channel subspace channel estimation. Such embodiments seek for the channel matrix $H_{N_w}$ in the form of $H_{N_w}=V_sQ$, where $V_s$ is a matrix of the $N_tK$ principal eigenvectors of the covariance matrix of $y_{N_w}(t)$, and Q is chosen such that the resulting matrix has a block Toeplitz structure as seen in equation (4). In a similar fashion to the SIMO structured channel subspace channel estimation method, a cost function $J=J_1+J_2+J_3$ can be minimized with respect to Q. The following equation (8) provides the cost function for MIMO signals:

$$J=\Sigma_{j=1}^{N_t(K-1)}\Sigma_{i=1}^{N_r(N_w-1)}|\hat{H}(i,j)-\hat{H}(i+N_r,j+N_t)|^2+\Sigma_{j=N_tL+1}^{N_tK}|\hat{H}(1:N_r,k)|^2+\Sigma_{i=N_r+1}^{N_rN_w}|\hat{H}(i,1:N_t)| \quad (8)$$

The first part of equation (8) enforces the block Toeplitz structure of the channel matrix $\hat{H}_{N_w}$. The second part of equation (8) is introduced to express that the tail of the first $N_r$ rows of the channel matrix $\hat{H}_{N_w}$ are equal to zero as shown in equation (4). The third part of equation (8) is introduced to express that the first $N_t$ columns of the matrix $\hat{H}_{N_w}$ are equal to zero as shown in equation (4).

Given that $J_A=[I_{N_tN_w-N_r} \ 0_{N_tN_w-N_r,N_r}]$, $\tilde{J}_A=[I_{N_tK-N_r} \ 0_{N_tK-N_r,N_r}]^T$, $J_B=[0_{N_tN_w-N_r,N_r} \ I_{N_tN_w-N_r}]$, $\tilde{J}_B=[0_{N_tK-N_t,N_t} \ I_{N_tK-N_t}]^T$, $0_{a,b}$ is an all zero matrix of size $a\times b$, and $I_a$ is the identity matrix of size $a\times a$, the three parts of the cost function J can be rewritten in a compact form as follows:

$$J_1=\|J_A\hat{H}_{N_w}\tilde{J}_A-J_B\hat{H}_{N_w}\tilde{J}_B\|^2 \quad (9)$$

Further, using the vectorization operator, denoted as vec(.), and the Kronecker product property of $vec(ABC)=[(C^T\oplus A)vec(B)]=[(C^T\oplus A)b]$, equation (9) can be rewritten compactly as:

$$J_1=\|(J_B^T\oplus J_A-\widetilde{J_B^T}\oplus \widetilde{J_A})vec(\hat{H}_{N_w})\|^2$$

$$J_1=\|(J_B^T\oplus J_A-\widetilde{J_B^T}\oplus \widetilde{J_A})(I\oplus V_s)q\|^2$$

$$J_1=\|K_1q\|^2 \quad (10)$$

where $q=vec(Q)$. A similar step can be performed to represent $J_2$ in a compact form shown below by equation (11):

$$J_2=\|J_{row}\hat{H}_{N_w}\widetilde{J_{row}}\|^2$$

$$J_2=\|(\widetilde{J_{row}^T}\oplus J_{row})vec(\hat{H}_{N_w})\|^2$$

$$J_2=\|(\widetilde{J_{row}^T}\oplus J_{row})(I\oplus V_s)q\|^2$$

$$J_2=\|K_2q\|^2 \quad (11)$$

where $J_{row}=[I_{N_r} \ 0_{N_r,N_wN_r-N_r}]$ and $\widetilde{J_{row}}=[0_{N_t(K-L-1),N_t(L+1)} \ I_{N_t(K-L-1)}]^T$. A similar step can also be performed to represent $J_3$ in a compact form shown below by equation (12):

$$J_3=\|J_{col}\hat{H}_{N_w}\widetilde{J_{col}}\|^2$$

$$J_3=\|(\widetilde{J_{col}^T}\oplus J_{col})vec(\hat{H}_{N_w})\|^2$$

$$J_3=\|(\widetilde{J_{col}^T}\oplus J_{col})(I\oplus V_s)q\|^2$$

$$J_3=\|K_3q\|^2 \quad (12)$$

where $J_{col}=[0_{N_rN_w-N_r,N_r} \ I_{N_rN_w-N_r}]$ and $\widetilde{J_{col}}=[I_{N_t} \ 0_{N_t,K-N_t}]T$. Equations (10), (11), and (12) can be used to reduce the optimization problem proposed by equation (8) down to the following:

$$J = \min_q q^H K^H K q \quad (13)$$

where $K=[K_1^T|K_2^T|K_3^T]^T$ and $K^H$ denote the Hermitian matrix of K. The smallest eigenvalue of $K^HK$ then corresponds to an eigenvector which is the optimal solution q under the unit norm constraint. The vector q can then be reshaped into the matrix Q with dimensions of $N_tK\times N_tK$. The matrix Q can be referred to as a parameter matrix.

No guarantee is provided that Q is full rank and that all channels are extracted. To provide such a guarantee, other constraints, such as enforcing a zero-lag matrix coefficient $\hat{H}(0)$ to be lower triangular with diagonal entries that are equal to 1 can be used. To do so, a corrective term $J_4$ can be added to the cost function of equation (13) shown below.

$$J_4=\Sigma_{j>i}\|\hat{H}_{i,j}(0)\|^2+\Sigma_i\|\hat{H}_{i,i}(0)-1\|^2$$

A resultant modified cost function (13*) (i.e., equation (13*)=J+$J_4$) is linear-quadratic with respect to the parameter vector q and hence can be assimilated to a standard least squares problem whose solution can be evaluated.

Embodiments can additionally provide for MIMO structured signal subspace signal estimation methods. Singular value decomposition can be applied to the data matrix Y to result in the following equation (14):

$$Y=U\Sigma V^H \quad (14)$$

where U and V are unitary matrices and $\Sigma$ is a diagonal matrix. Let $U_{SS}$ to be the first $N_t(N_w+L)$ columns of U, $V_{SS}$ to be the first $N_t(N_w+L)$ rows of V, and $\Sigma_{SS}$ to be a square matrix formed from the first $N_t(N_w+L)$ columns and rows of $\Sigma$. Assuming there is no noise in the MIMO system, the subspace spanned by the rows of $S_K$ coincide with the subspace spanned by the rows of $V_{SS}^H$. Hence, MIMO structured signal subspace signal estimation can search for the signal in the form of $\widehat{S_K} = QV_{SS}^H$. The matrix Q can be chosen to ensure the block Toeplitz structure of the signal matrix in equation (6) is exploited by minimizing a structure-based cost function with respect to Q as seen in equation (15) below:

$$J = \sum_{i=1}^{N_t(K-1)} \sum_{j=1}^{N-N_w} |\hat{S}(i,j) - \hat{S}(i+N_t, j+1)|^2 \quad (15)$$

where $\hat{S}(i,j)$ is the (i,j)-th entry of $\widehat{S_K}$. The cost function J can be written in a compact form as follows:

$$J = \|J_C \widehat{S_K} \tilde{J}_C - J_D \widehat{S_K} \tilde{J}_D\|^2 \quad (16)$$

where $J_C = [I_{K-N_t}\ 0_{(K-N_t),N_t}]$, $\tilde{J}_C = [I_{N-N_w}\ 0_{1,(N-N_w)}]^T$, $J_D = [0_{(K-N_t),N_t}\ I_{K-N_t}]$, and $\tilde{J}_D = [0_{(N-N_w),1}\ I_{N-N_w}]^T$. Using the same approach to rewrite equation (9) to equation (10), equation (16) can be rewritten as equation (17) shown below:

$$J = \|(V_{SS}^H \tilde{J}_C)^T \oplus J_C - (V_{SS}^H \tilde{J}_D)^T \oplus J_D)\text{vec}(Q)\|^2$$

$$J = \|Kq\|^2 \quad (17)$$

The optimization problem presented by equation (17) is similar to the previous optimization presented by equation (13). Thus, the solution is found from the smallest eigenvalue of $K^H K$ which corresponds to an eigenvector that is the optimal solution for q under the unit norm constraint. The vector q can then be reshaped into a matrix Q with a dimension of K×K. The vector q can be referred to as a parameter vector and the matrix Q can be referred to as a parameter matrix. Embodiments provide for significant advantages when processing short data sequences. Embodiments are particularly advantageous in wireless communication systems, where the environment is rapidly changing.

Embodiments can yet additionally provide for bilinear MIMO estimation methods. The bilinear method can exploit both column and row subspace structures to build a cost function that seeks the channel matrix $H_{N_w}$ (or equivalently, the signal matrix $S_K$) iteratively.

Using the data matrix singular value decomposition of equation (14) and assuming no noise in the signal, the data matrix can be written as equation (18) below:

$$Y = U_{SS} \Sigma_{SS} V_{SS}^H$$

$$Y = U_{SS} \tilde{V}_{SS}$$

$$Y = H_{N_w} S_K \quad (18)$$

where $\tilde{V}_{SS} = \Sigma V_{SS}^H$. For any non-singular matrix Q, the right-hand side of the equation can be written as $H_{N_w} S_K = (U_{SS} Q)(Q^{-1} \tilde{V}_{SS})$. Hence, a matrix Q can be chosen such that $H_{N_w} = U_{SS} Q$ and $S_K = Q^{-1} \tilde{V}_{SS}$. In the presence of noise, the latter equalities are satisfied only approximately, by minimizing a composite criterion relative to the Toeplitz structures of $H_{N_w}$ and $S_K$. Such a criterion involves a non-linear matrix inversion (i.e., $Q^{-1}$) and both the left and right unitary matrices obtained from the singular value decomposition of the data matrix. Embodiments can minimize the noise effect by using an iterative approach in conjunction with an appropriate linear approximation of the inverse matrix, updated according to the following equations (19) and (20):

$$Q_{new} = Q_{old}(I+E) \quad (19)$$

$$Q_{new}^{-1} \approx (I-E)Q_{old}^{-1} \quad (20)$$

where $Q_{old}$ refers to the current value of Q, $Q_{new}$ refers to the updated value of Q, and E denotes the correction matrix term whose elements have small values to allow the considered linear approximation. By using equation (20), a composite cost function can be written as equation (21):

$$J(E) = J_{e1} + J_{e2} + J_{e3} \quad (21)$$

where $J_{e1}$ denotes the cost function that minimizes the non-zero block Toeplitz structure of $U_{SS} Q_{new}$, $J_{e2}$ denotes the block Toeplitz structure of $Q_{new}^{-1} \tilde{V}_{SS}$, and $J_{e3}$ denotes the cost function that tends to minimize the zero terms of the first row and the first column blocks of $U_{SS} Q_{new}$.

The first term in equation (21) is defined by the following:

$$J_{e1} = \|J_A U_{SS} Q_{old}(I+E) \tilde{J}_A - J_B U_{SS} Q_{old}(I+E) \tilde{J}_B\|^2$$

$$J_{e1} = \|A + A_1 E \tilde{J}_A - A_2 E \tilde{J}_B\|^2$$

$A = J_A U_{SS} Q_{old} \tilde{J}_A - J_B U_{SS} Q_{old} \tilde{J}_B A_1 = J_A U_{SS} Q_{old} A_2 = J_B U_{SS} Q_{old} J_{e1} J_{e1} = \|A\|^2 + 2\text{Re}\{\text{Tr}(\tilde{J}_A A^H A_1 - \tilde{J}_B A^H A_2)E\}$ where, and. Using a first order approximation, can be rewritten as:

$$A = J_A U_{SS} Q_{old} \tilde{J}_A - J_B U_{SS} Q_{old} \tilde{J}_B A_1 = J_A U_{SS} Q_{old} A_2 = J_B U_{SS} Q_{old} J_{e1}$$

where Re{ } denotes the real part and Tr( ) represents the trace operation. Similarly, the second part of equation (21) can be rewritten as:

$$J_{e2} = \|J_C(I-E)Q_{old}^{-1} \tilde{V}_{SS} \tilde{J}_C - J_D(I-E)Q_{old}^{-1} \tilde{V}_{SS} \tilde{J}_D\|^2$$

$$J_{e2} = \|B\|^2 + 2\text{Re}\{\text{Tr}(B_2 B^H J_D - B_1 B^H J_C)E\}$$

where $B = J_C Q_{old}^{-1} \tilde{V}_{SS} \tilde{J}_C - J_D Q_{old}^{-1} \tilde{V}_{SS} \tilde{J}_D$, $B_1 = Q_{old}^{-1} \tilde{V}_{SS} \tilde{J}_C$, and $B_2 = Q_{old}^{-1} \tilde{V}_{SS} \tilde{J}_D$. The third part of equation (21) can be rewritten as:

$$J_{e3} = \|J_{row} U_{SS} Q_{old}(I+E) \tilde{J}_{row}\|^2 + \|J_{col} U_{SS} Q_{old}(I+E) \tilde{J}_{col}\|^2$$

$$J_{e3} = \|C\|^2 + \|D\|^2 + 2\text{Re}\{\text{Tr}(\tilde{J}_{row} C^H C_1 + \tilde{J}_{col} D^H D_1)E\}$$

where $C = J_{row} U_{SS} Q_{old} \tilde{J}_{row}$, $C_1 = J_{row} U_{SS} Q_{old}$, $D = J_{col} U_{SS} Q_{old} \tilde{J}_{col}$, $D_1 = J_{col} U_{SS} Q_{old}$. The three rewritten parts of equation (21) can be combined to rewrite the equation as:

$$J(E) = \|A\|^2 + \|B\|^2 + \|C\|^2 + \|D\|^2 + 2\text{Re}\{\text{Tr}(M_A + M_B + M_C)E\} \quad (22)$$

where $M_A = \tilde{J}_A A^H A_1 - \tilde{J}_B A^H A_2$, $M_B = B_2 B^H J_D - B_1 B^H J_C$, and $M_C = \tilde{J}_{row} C^H C_1 + \tilde{J}_{col} D^H D_1$. The correction matrix term E is chosen to follow the opposite direction of the gradient, according to:

$$E = -\mu(M_A + M_B + M_C)^H \quad (23)$$

where $\mu$ is a small positive constant. The bilinear algorithms can be initialized by embodiments using MIMO structured channel subspace channel estimation, after which one or more iterations can be applied to refine the channel (and signal matrix) estimation.

The computational complexity of embodiments is summarized below in Table 1. The bilinear method is initialized using the MIMO structured channel subspace channel estimation, and as such is the heaviest computationally.

TABLE 1

|  | Computational Complexity |
|---|---|
| MIMO Structured Channel Subspace Channel Estimation | $O((N_r N_w)^2 (N - N_w)) +$ $O(N_r N_w N_t K)^2$ |
| MIMO Structured Signal Subspace Signal Estimation | $O((N_r N_w)(N - N_w)^2) +$ $O(N_t K(N - N_w))^2$ |
| Bilinear MIMO Estimation | $O((N_r N_w)(N - N_w)^2) +$ $O(N_t K(N - N_w))^2 +$ $O(N_r N_w N_t K)^2$ |

Figure 2:
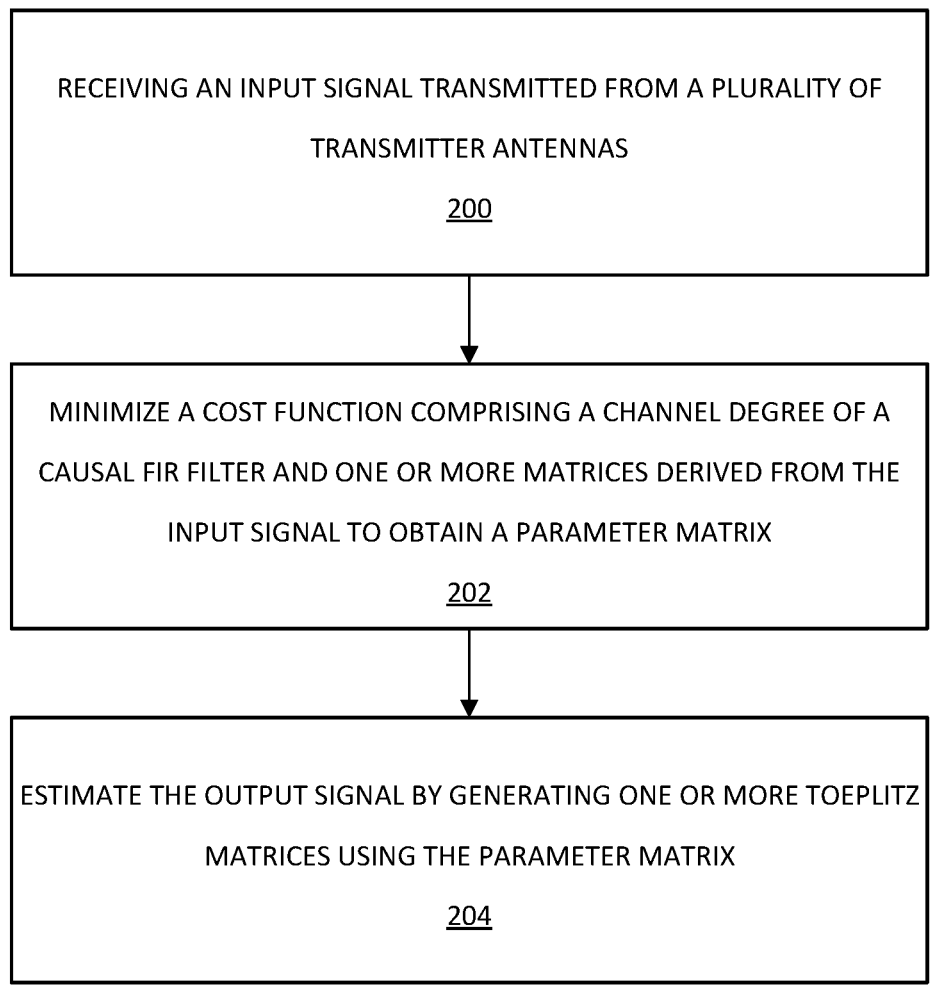
FIG. 2 shows a method for multiple-input multiple-output blind channel estimation according to certain embodiments.

FIG. 2 shows a method for multiple-input multiple-output blind channel estimation according to certain embodiments. The method shown in FIG. 2 can implement a MIMO structured signal subspace estimation method that directly estimates the input signal in MIMO systems. Alternatively, the method can implement a MIMO structured channel subspace estimation method that estimates the channel first, then uses the channel information to estimate the input signal. As yet another alternative, the method can implement a MIMO bilinear estimation method to estimate both the input signal land channel.

The method can be implemented by any receiver and transmitter pair. For example, two mobile phones can communicate wirelessly with one acting as a receiver and the other as the transmitter, or vice versa. Other examples can include seismology, wherein a seismic meter can receive different frequencies of waves, image processing, radar detection, or the like. The method can be performed by a signal processing module that is coupled to the receiver and in communication with a causal finite impulse response filter.

At step 200, the signal processing module can receive an input signal from the receiver. The input signal can be obtained by the plurality of receiver antennas of the receiver. The input signal can correspond to an output signal that is transmitted by a plurality of transmitter antennas of the transmitter.

At step 202, the signal processing module can minimize a cost function. The cost function can be varied based on the desired estimation method to be used. For the MIMO structured signal subspace estimation method, the cost function described by equation (13) can be used. In some embodiments, equation (13) can be further modified to include a correction term if the parameter matrix of the cost function described by equation (22) can be used.

Each of the three described cost functions are based at least on channel degree L of the FIR filter, which determines the measured input signal and one or more matrices derived from the input signal. For the MIMO structured signal subspace estimation method, the matrix $V_S$ which is the matrix of the $N_r K$ principal eigenvectors of the covariance matrix of the input $y_{N_w}(t)$ is used. For the MIMO structured channel subspace estimation method, matrix $V_{SS}$ obtained by the singular value decomposition of the data matrix Y (which is formed from the input signal) is used. Similarly, for the bilinear MIMO estimation method, the left and right unitary matrices $U_{SS}$ and $V_{SS}$ from the singular value decomposition of the data matrix Y is used. The cost function is minimized to find a minimum parameter vector q under the unit norm constraint, which is then reshaped to obtain a parameter matrix Q.

At step 204, the signal processing module can then estimate the output signal by first generating one or more Toeplitz matrices. The signal processing module can generate an estimated signal Toeplitz matrix $\hat{S}_K$ that directly estimates the output signal (in structured signal subspace estimation), or an estimated channel Toeplitz matrix (in structured channel subspace estimation) that estimates channel parameters which can then be used to estimate the output signal. In bilinear estimation, the signal processing module can use both the estimated signal Toeplitz matrix $\hat{S}_K$ and the estimated channel Toeplitz matrix $\hat{H}_{N_w}$.

The performance of embodiments is measured. One performance metric used is normalized mean squared error (NMSE), given by $$NMSE(\text{dB}) = 20\log_{10}(\frac{1}{\|h\|}\sqrt{\frac{1}{N_{mc}}\sum_{i=1}^{N_{mc}}\|\hat{h}_i - h\|^2}),$$

where $N_{mc}$ is the number of Monte Carlo runs and $\hat{h}_i$ is the vectorized form of the estimated channel. The second performance metric used is symbol error rate (SER) after ambiguity removal. The SER is the ratio of the total number of the wrongly detected symbols to that of transmitted symbols. In each of the following simulations of FIGS. 3-9, the SER and NMSE are obtained by averaging 100 Monte Carlo runs (i.e., $N_{mc}$=100). A 4QAM input signal and additive noise are generated for each Monte Carlo run. The deployed channels are randomly generated in each run. The input signal length considered is N=100 symbols in each simulation unless otherwise specified. The signal-to-noise ratio (SNR) is varied.

The performance of MIMO structured signal subspace estimation method provided by embodiments is measured for different choices of multiple receiver antenna $N_r$ and multiple transmitter antenna $N_t$ are considered. The channel order is given as L=3 with a window size chosen to be $N_w$=$N_r$×L+1. The performance of the MIMO structured signal subspace estimation method is compared to that of the MIMO structured channel subspace estimation method, in which the channel is first estimated and is then used to estimate the signal.

Figure 3:
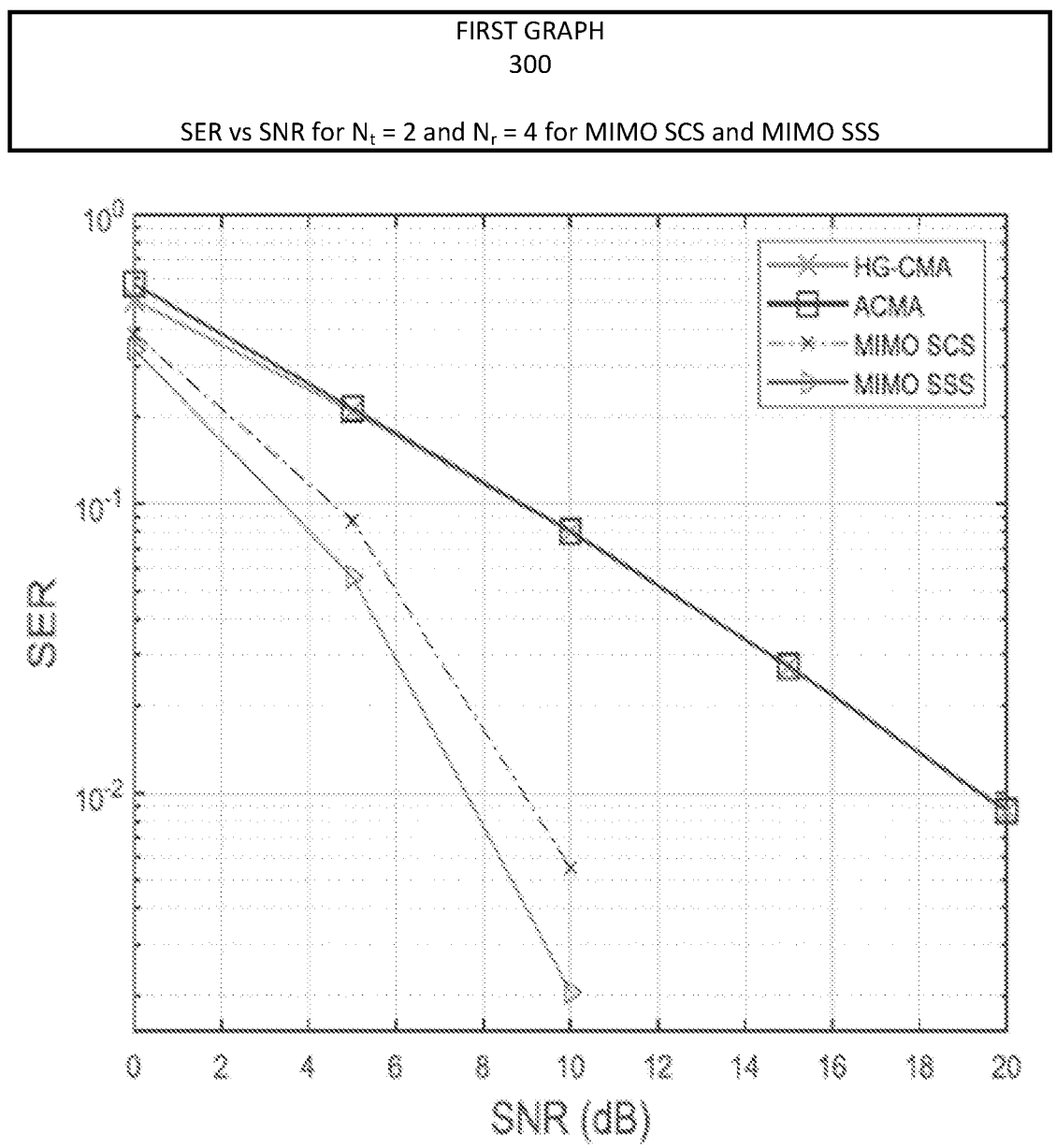
FIG. 3 shows a first graph according to certain embodiments.

FIG. 3 shows a first graph 300 according to certain embodiments. The performance of MIMO structured signal subspace estimation method (MIMO SSS), the MIMO structured channel subspace estimation method (MIMO SCS), the hyperbolic givens constant modulus algorithm (HG-CMA) method, and the analytical constant modulus algorithm (ACMA) method is measured for $N_t$=2 and $N_r$=4 in terms of SER. The MIMO structured signal subspace estimation method outperforms the MIMO structured channel subspace estimation method for all values of SNR. Both the MIMO structured signal subspace and the MIMO structured channel subspace estimation methods significantly outperform the CMA-based algorithms. As the SNR increases, the performance of the MIMO structured signal subspace estimation method improves significantly as compared to the MIMO structured channel subspace estimation method. For example, at a SER of $10^{-2}$, a gain of almost 1.5 dB in favor of the MIMO structured signal subspace S method is observed.

Figure 4:
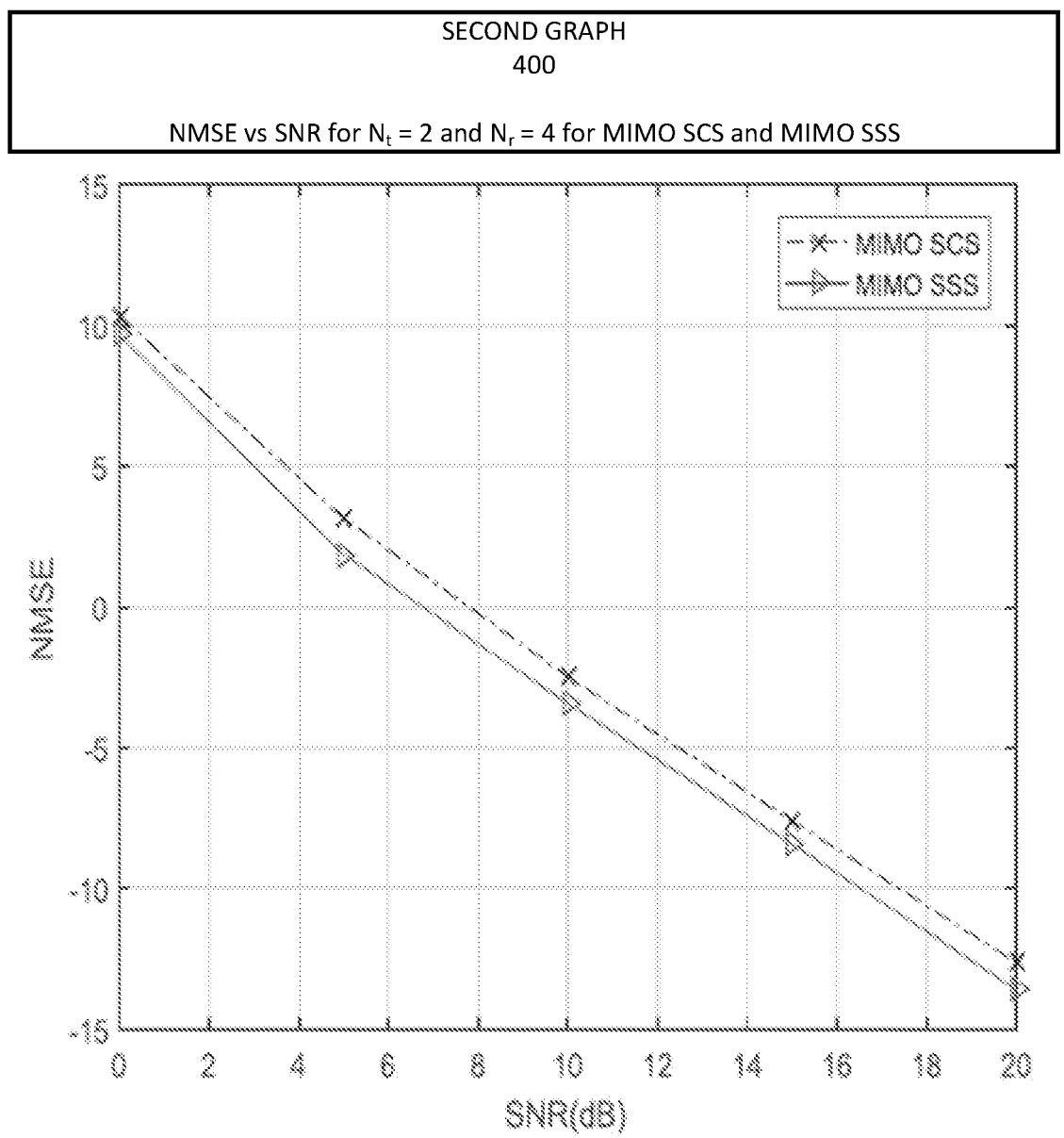
FIG. 4 shows a second graph according to certain embodiments.

FIG. 4 shows a second graph 400 according to certain embodiments. The performance of the MIMO structured signal subspace estimation method and the MIMO structured channel subspace estimation method is measured for $N_t$=2 and $N_r$=4 in terms of NMSE. Similar behavior to that of the first graph 300 is observed. As the SNR increases, the NMSE metric for the MIMO structured signal subspace estimation method decreases more than that of the MIMO structured channel subspace estimation method.

Figure 5:
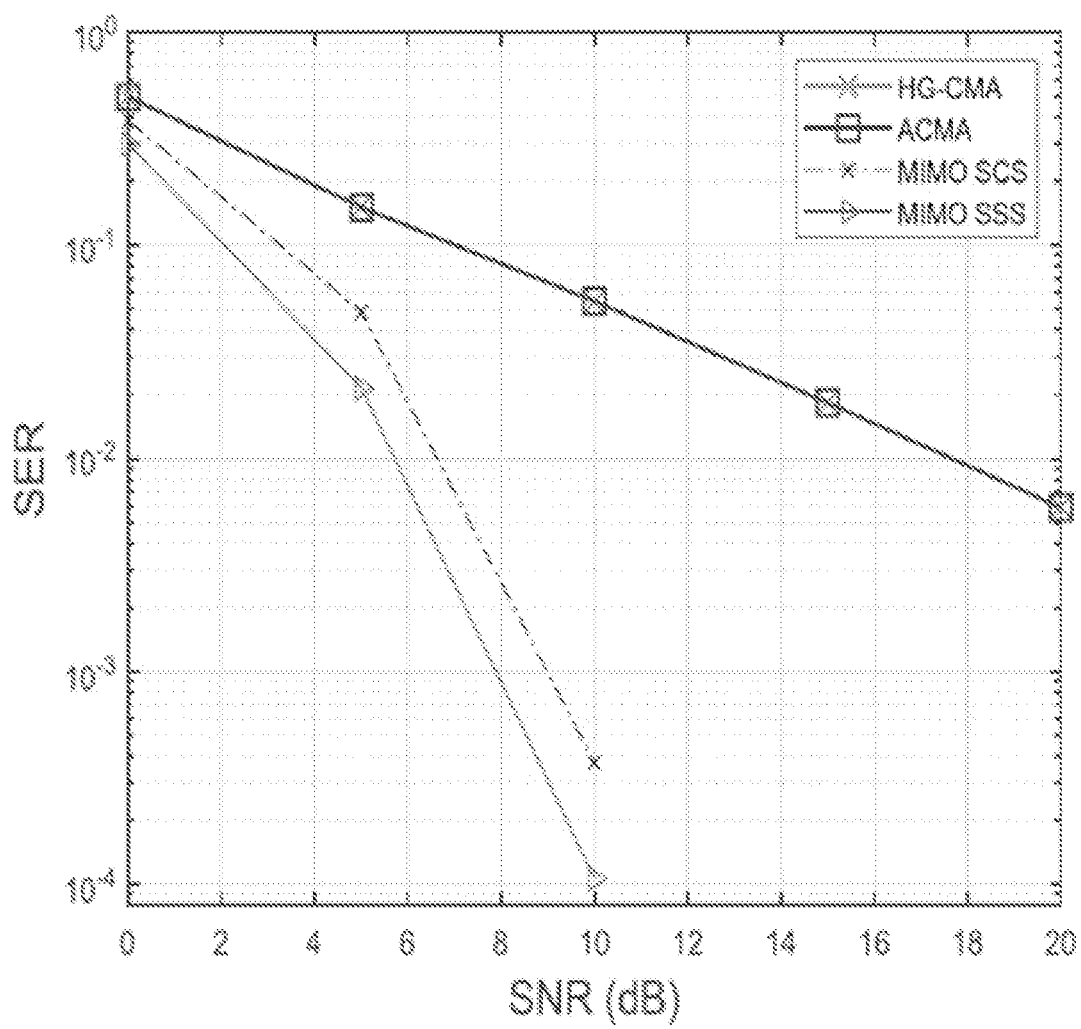
FIG. 5 shows a third graph according to certain embodiments.

FIG. 5 shows a third graph 500 according to certain embodiments. The performance of the MIMO structured signal subspace estimation method, the MIMO structured channel subspace estimation method, the HG-CMA method, and the ACMA method is measured for $N_t=2$ and $N_r=5$ in terms of SER. The third graph 500 shows that the MIMO structured signal subspace estimation method has a higher gain as compared to the MIMO structured channel subspace, and CMA methods for all SNR values. Both of the MIMO structured signal subspace and MIMO structured channel subspace estimation methods outperform the CMA methods. It follows that it is advantageous to estimate the signal directly, than to estimate the channel first and then use the estimation to estimate the signal.

Figure 6:
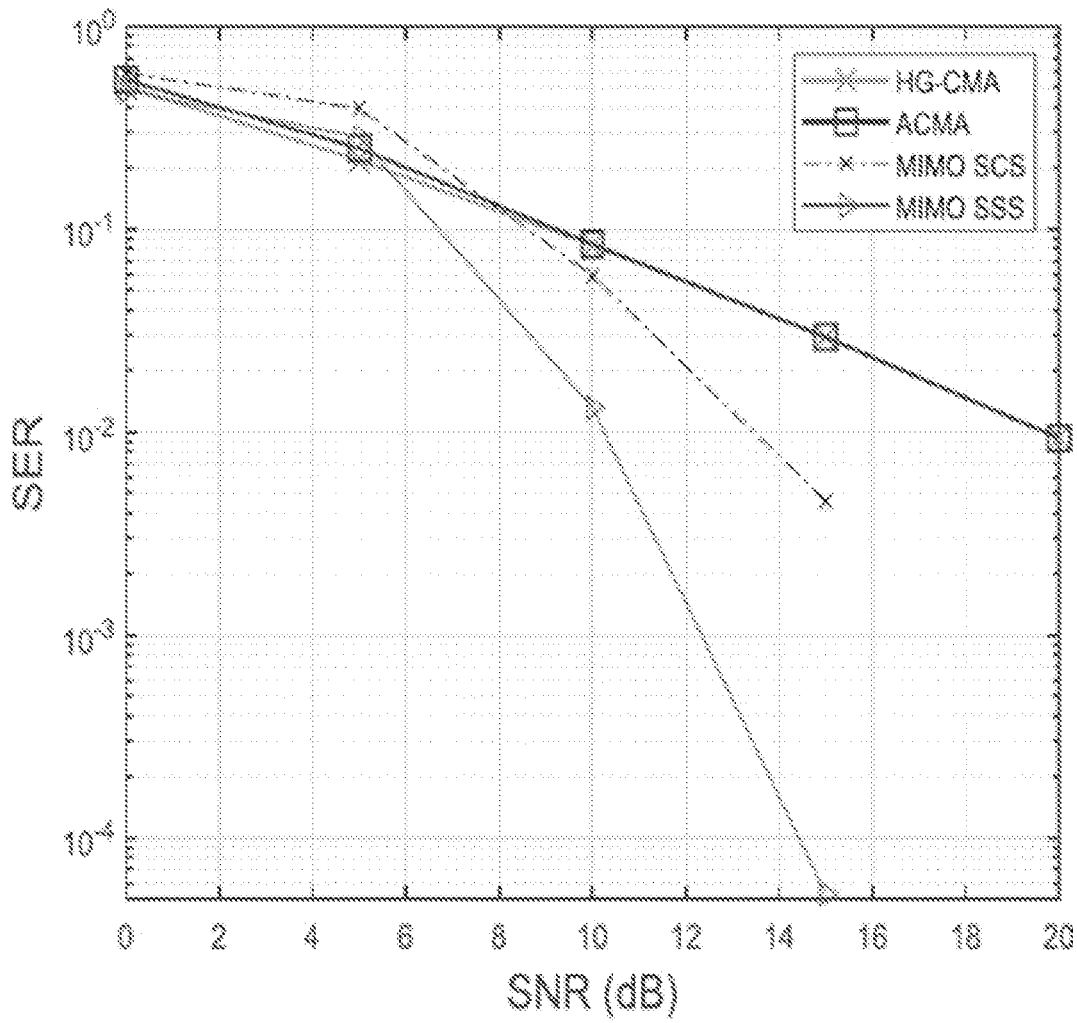
FIG. 6 shows a fourth graph according to certain embodiments.

FIG. 6 shows a fourth graph 600 according to certain embodiments. A short burst case is simulated, where the length of the transmitted data is small. In this simulation, the input signal is considered of length N=50, and the number of transmit and receive antennas are $N_t=2$ and $N_r=5$ respectively. Here, the MIMO structured signal subspace estimation method outperforms the MIMO structured channel subspace and CMA methods at SNR above 5 dB.

Figure 7:
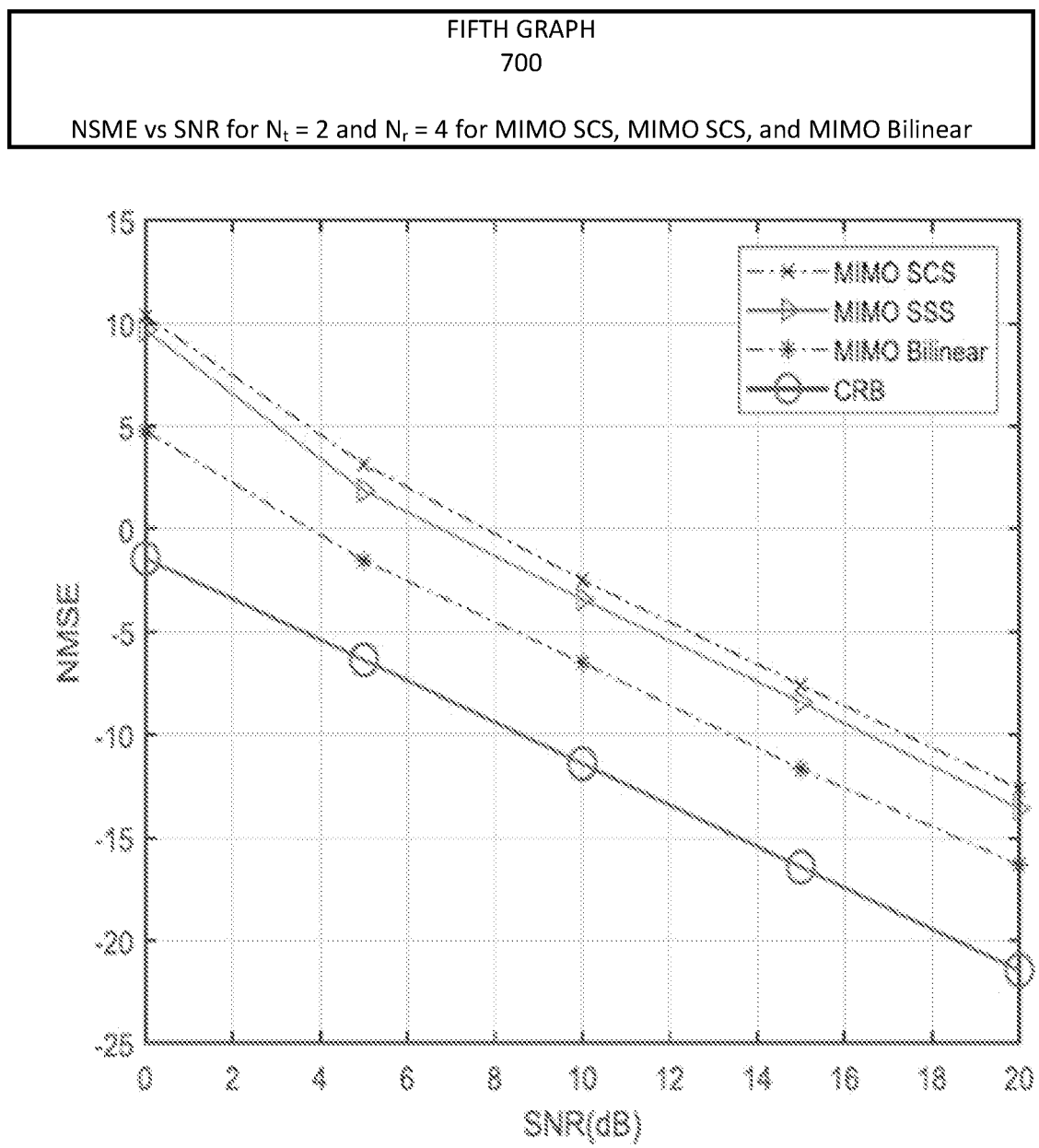
FIG. 7 shows a fifth graph according to certain embodiments.

FIG. 7 shows a fifth graph 700 according to certain embodiments. The performance of the MIMO structured signal subspace estimation method, the MIMO structured channel subspace estimation method, the MIMO bilinear estimation method, and the ACMA method is measured for $N_t=2$ and $N_r=4$ in terms of NMSE. The MIMO bilinear estimation method is compared to the MIMO structured channel subspace estimation method, the MIMO structured signal subspace estimation method, and the ACMA method in terms of NMSE.

Figure 8:
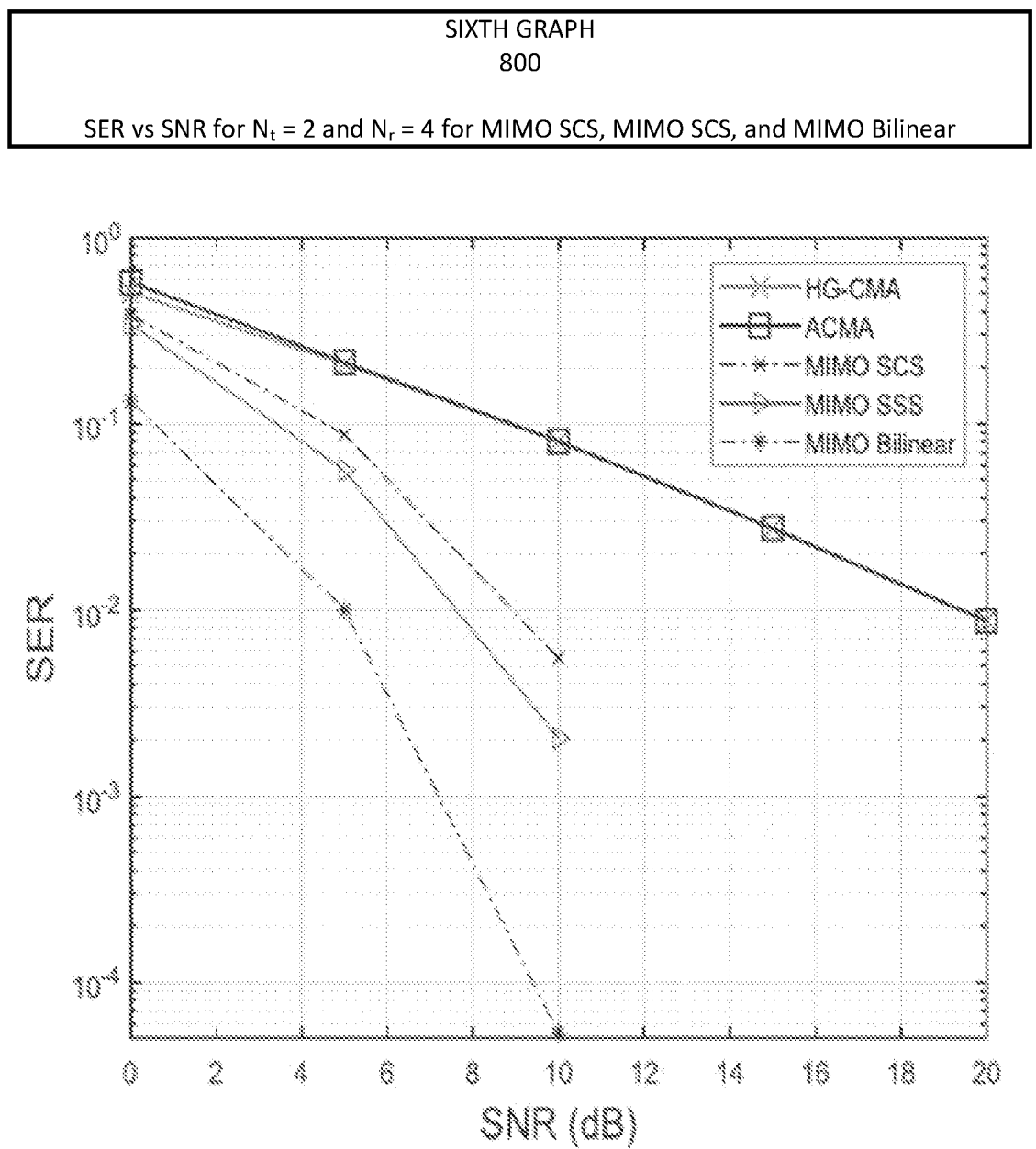
FIG. 8 shows a sixth graph according to certain embodiments.

FIG. 8 shows a sixth graph 800 according to certain embodiments. The performance of the MIMO structured signal subspace estimation method, the MIMO structured channel subspace estimation method, the MIMO bilinear estimation method, and the ACMA method is measured for $N_t=2$ and $N_r=4$ in terms of SER. From FIG. 7 and FIG. 8, the MIMO bilinear estimation method outperforms the other methods at all SNRs. The MIMO bilinear estimation method utilizes both the signal and channel subspace information, and iteratively searches for the global minimum, whereas the MIMO structured channel subspace and the MIMO structured signal subspace estimation methods do not.

Figure 9:
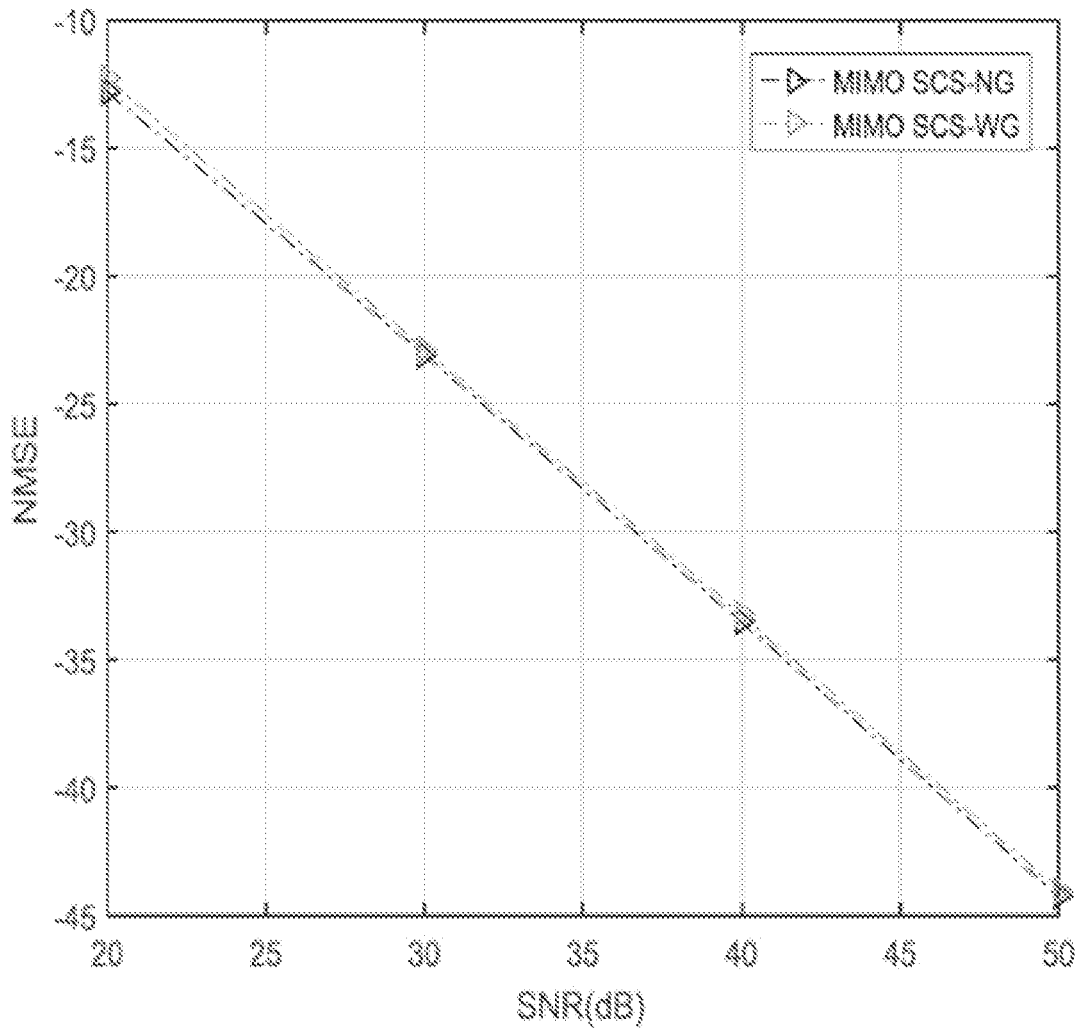
FIG. 9 shows a seventh graph according to certain embodiments.

FIG. 9 shows a seventh graph 900 according to certain embodiments. The performance of a scenario where the MIMO structured channel subspace has a matrix Q is a full rank matrix (MIMO structured channel subspace-WG) to a scenario in which the MIMO structured channel subspace has no guarantee that the matrix Q is a full rank matrix (MIMO structured channel subspace-NG). As shown by seventh graph 900, a guarantee of a full rank matrix Q gives similar results to when no guarantee is given. In the second scenario, the use of the fourth term to modify equation (13) can be used.

Figure 10:
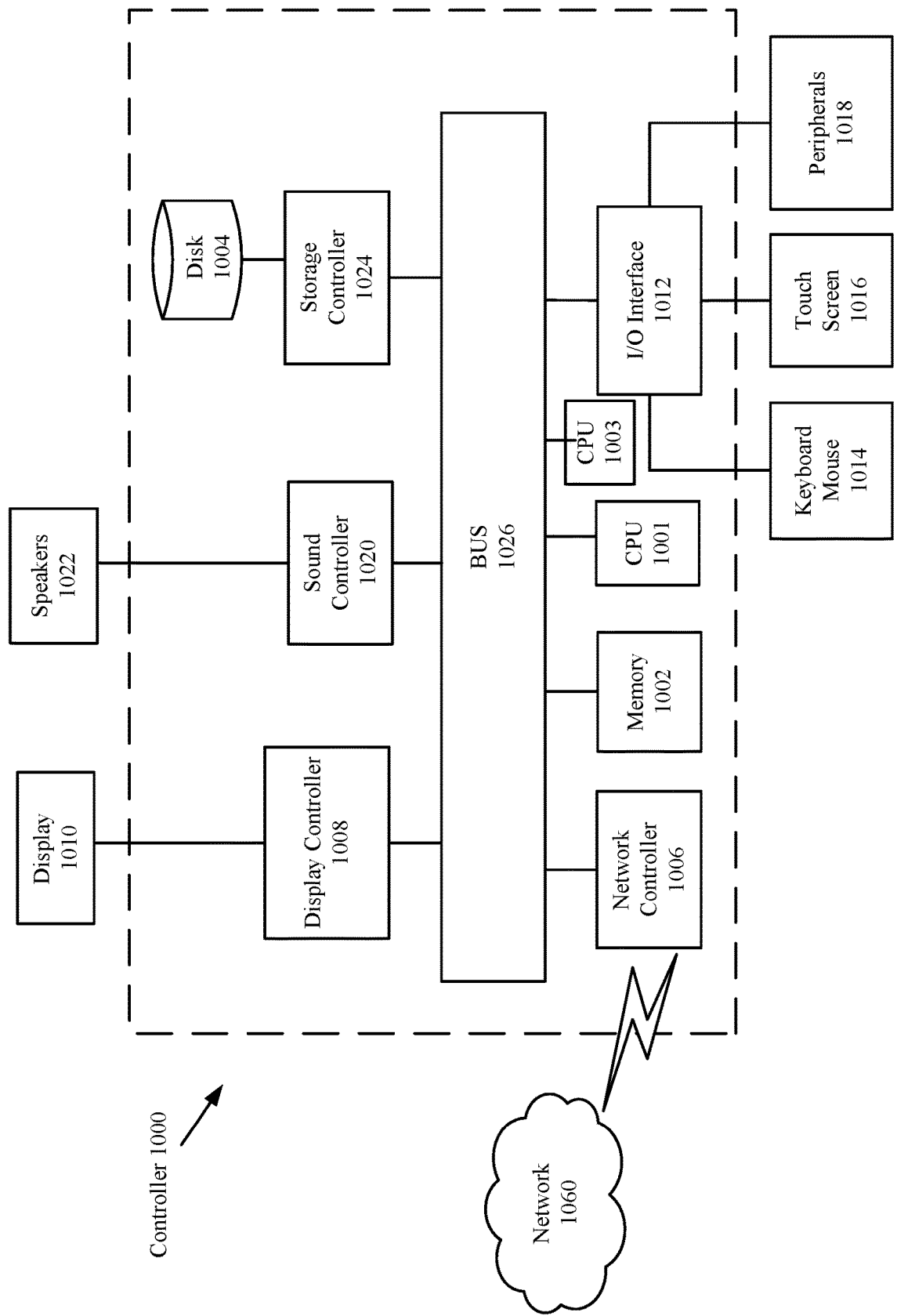
FIG. 10 is an illustration of a non-limiting example of details of computing hardware used in the computing system, according to certain embodiments.

Next, further details of the hardware description of the computing environment according to exemplary embodiments is described with reference to FIG. 10. In FIG. 10, a controller 1000 is described is representative of the processing module 114 of FIG. 1 in which the controller is a computing device which includes a CPU 1001 which performs the processes described above/below. The process data and instructions may be stored in memory 1002. These processes and instructions may also be stored on a storage medium disk 1004 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1001, 703 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 1001 or CPU 1003 may be a Xenon or Core processor from Intel of America or an Opteron processor from AMD of America, or may be other processor types that would be recognized by one of ordinary skill in the art. Alternatively, the CPU 1001, 703 may be implemented on an FPGA, ASIC, PLD or using discrete logic circuits, as one of ordinary skill in the art would recognize. Further, CPU 1001, 703 may be implemented as multiple processors cooperatively working in parallel to perform the instructions of the inventive processes described above.

The computing device in FIG. 10 also includes a network controller 1006, such as an Intel Ethernet PRO network interface card from Intel Corporation of America, for interfacing with network 1060. As can be appreciated, the network 1060 can be a public network, such as the Internet, or a private network such as an LAN or WAN network, or any combination thereof and can also include PSTN or ISDN sub-networks. The network 1060 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or DeskJet from Hewlett Packard.

A sound controller 1020 is also provided in the computing device such as Sound Blaster X-Fi Titanium from Creative, to interface with speakers/microphone 1022 thereby providing sounds and/or music.

The general purpose storage controller 1024 connects the storage medium disk 1004 with communication bus 1026, which may be an ISA, EISA, VESA, PCI, or similar, for interconnecting all of the components of the computing device. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 11.

Figure 11:
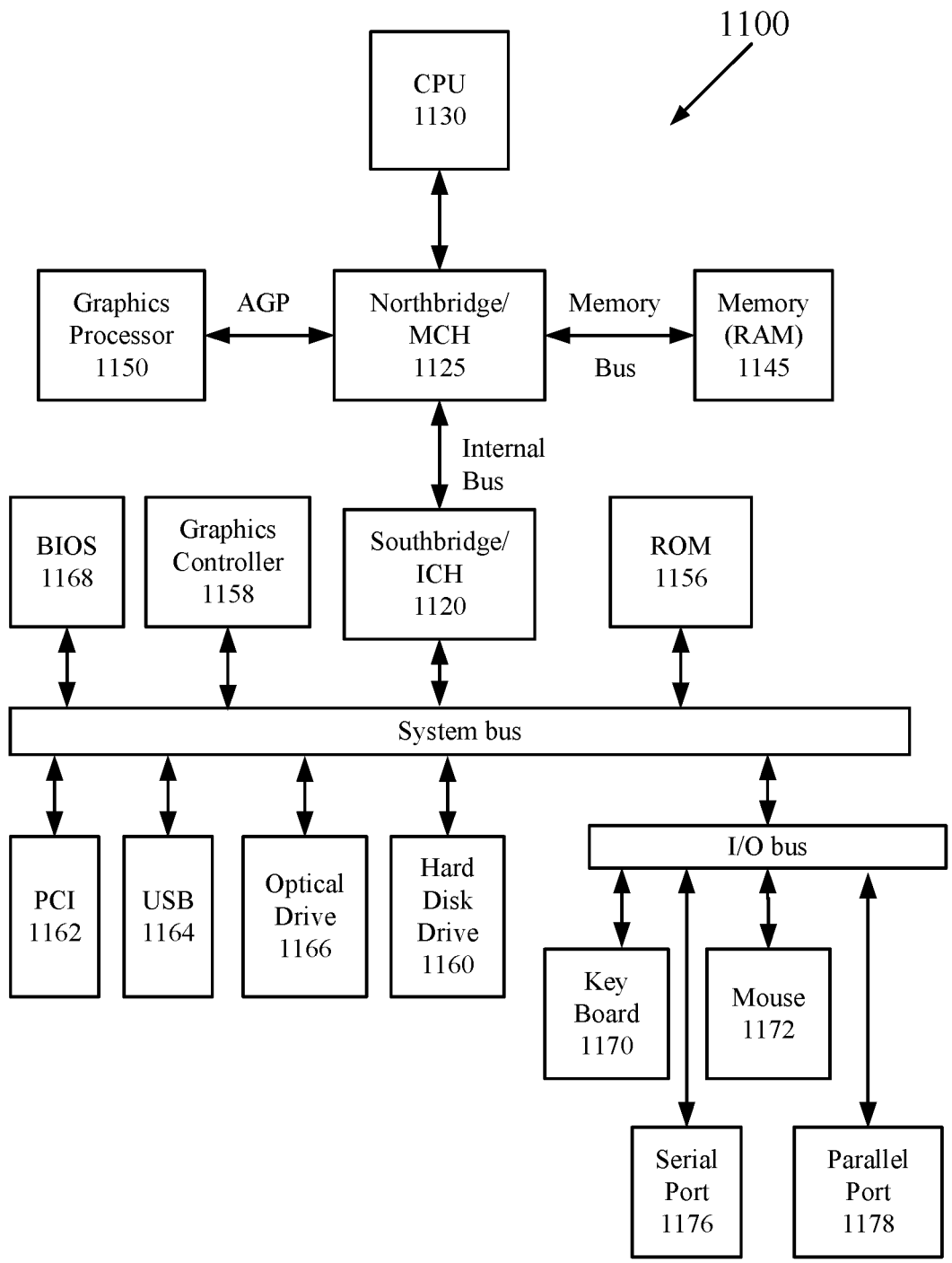
FIG. 11 is an exemplary schematic diagram of a data processing system used within the computing system, according to certain embodiments.

FIG. 11 shows a schematic diagram of a data processing system, according to certain embodiments, for performing the functions of the exemplary embodiments. The data processing system is an example of a computer in which code or instructions implementing the processes of the illustrative embodiments may be located.

In FIG. 11, data processing system 1100 employs a hub architecture including a north bridge and memory controller hub (NB/MCH) 1125 and a south bridge and input/output (I/O) controller hub (SB/ICH) 1120. The central processing unit (CPU) 830 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU Processing unit 830 may contain one or more processors and even may be implemented using one or more heterogeneous processor systems.

Figure 12:
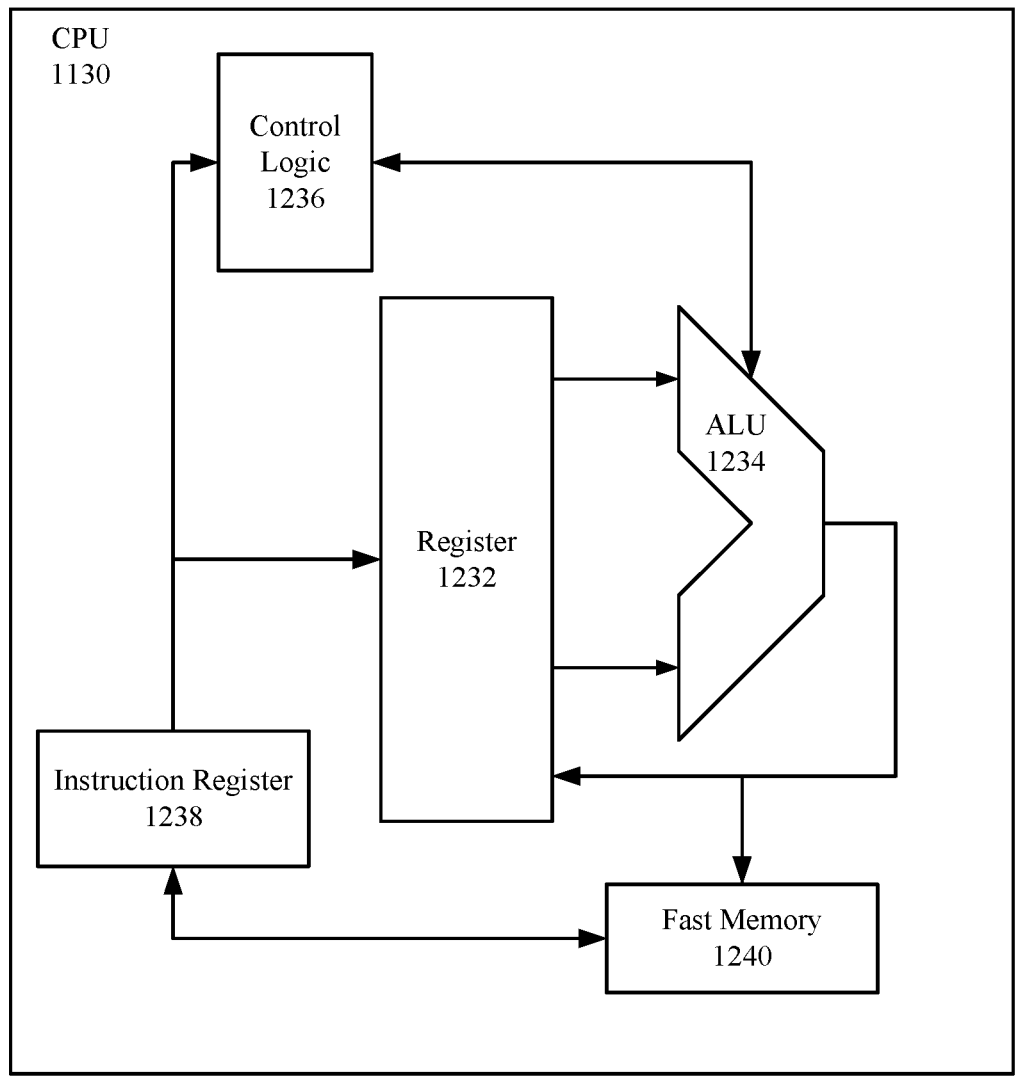
FIG. 12 is an exemplary schematic diagram of a processor used with the computing system, according to certain embodiments.

For example, FIG. 12 shows one implementation of CPU 1130. In one implementation, the instruction register 1238 retrieves instructions from the fast memory 1240. At least part of these instructions are fetched from the instruction register 1238 by the control logic 1236 and interpreted according to the instruction set architecture of the CPU 1130. Part of the instructions can also be directed to the register 1232. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1234 that loads values from the register 1232 and performs logical and mathematical operations on the loaded values according to the instructions. The results from these operations can be feedback into the register and/or stored in the fast memory 1240. According to certain implementations, the instruction set architecture of the CPU 1130 can use a reduced instruction set architecture, a complex instruction set architecture, a vector processor architecture, a very large instruction word architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 11, the data processing system 1100 can include that the SB/ICH 1120 is coupled through a system bus to an I/O Bus, a read only memory (ROM) 1156, universal serial bus (USB) port 1164, a flash binary input/output system (BIOS) 1168, and a graphics controller 1158. PCI/PCIe devices can also be coupled to SB/ICH 1120 through a PCI bus 1162.

The PCI devices may include, for example, Ethernet adapters, add-in cards, and PC cards for notebook computers. The Hard disk drive 1160 and CD-ROM 1166 can use, for example, an integrated drive electronics (IDE) or serial advanced technology attachment (SATA) interface. In one implementation the I/O bus can include a super I/O (SIO) device.

Further, the hard disk drive (HDD) 1160 and optical drive 1166 can also be coupled to the SB/ICH 1120 through a system bus. In one implementation, a keyboard 1170, a mouse 1172, a parallel port 1178, and a serial port 1176 can be connected to the system bus through the I/O bus. Other peripherals and devices that can be connected to the SB/ICH 1120 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 13:
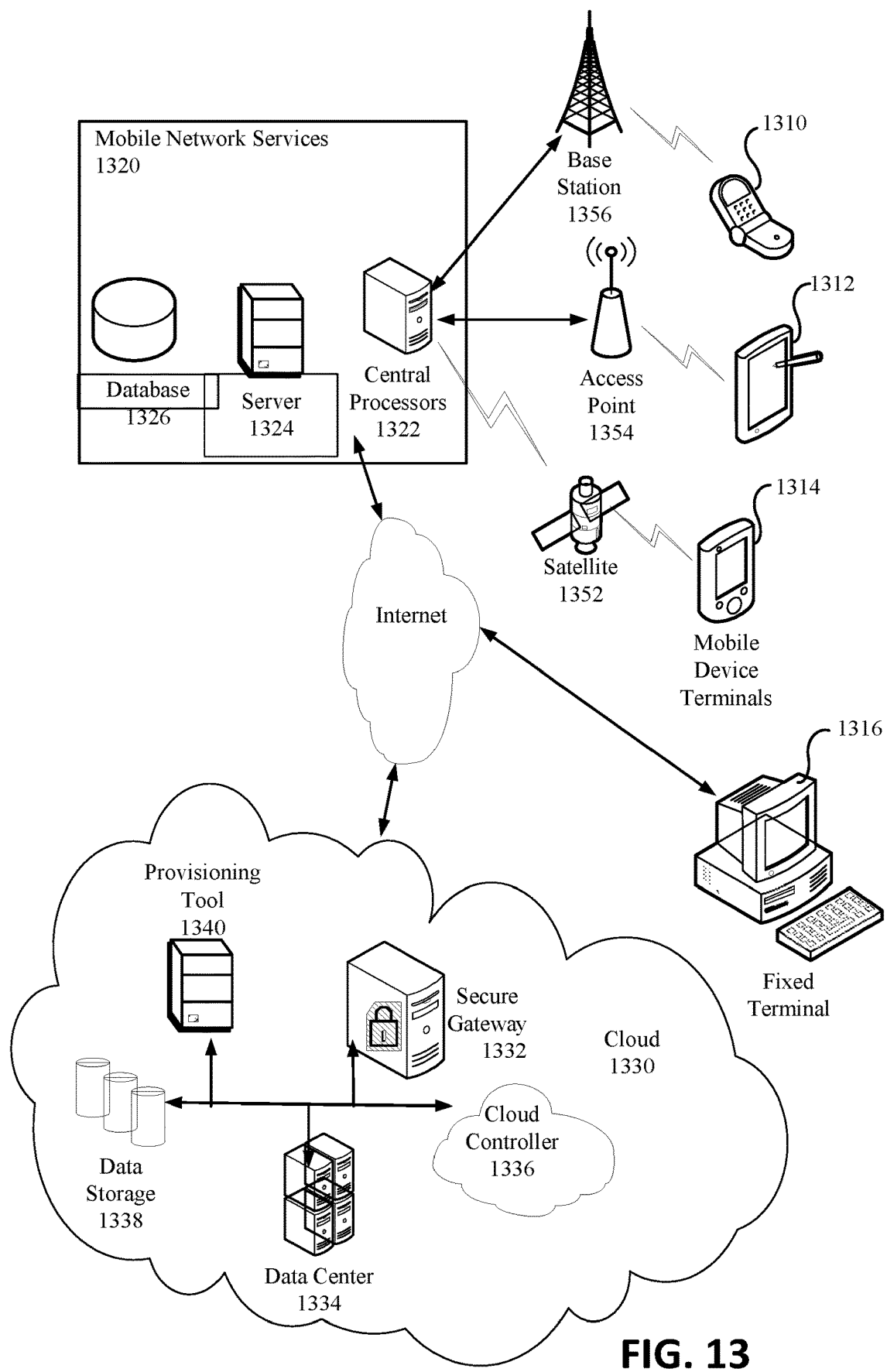
FIG. 13 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 13, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A system for blind estimation of multiple-input multiple-output systems, comprising:
   transmitter located in a first mobile phone, wherein the transmitter comprises two or more transmitter antennas, wherein each transmitter antenna is configured to transmit an output signal;
   receiver located in a second mobile phone, wherein the receiver comprises two or more receiver antennas, wherein each receiver antenna is configured to receive an input signal which corresponds to the output signals transmitted from the two or more transmitter antennas;
   a filtering module located in the second mobile phone, wherein the filtering module comprises a causal finite impulse response filter having a channel degree; and
   a signal processing module electronically coupled to the receiver of the second mobile phone and configured to estimate the output signals by the generation of one or more Toeplitz matrices, wherein the generation one or more Toeplitz matrices comprises the estimation of a parameter matrix by a minimization of a cost function comprising the channel degree and one or more matrices derived from the input signal, wherein the cost function further comprises a corrective term which enforces a zero-lag matrix coefficient to be lower triangular with diagonal entries that are equal to 1, wherein the causal finite impulse response filter is configured with a tap coefficient for each of a plurality of delay lines, and wherein the signal processing module is configured to estimate the tap coefficients from the minimization of the cost function and apply the estimated tap coefficients to the causal finite impulse response filter.

2. The system of claim 1, wherein the cost function comprises a matrix that is formed using the principal eigenvectors of a covariance matrix of the input signal.

3. The system of claim 1, wherein the cost function comprises a matrix that is formed by performing a singular value decomposition of a data matrix formed from the input signal.

4. The system of claim 3, wherein the signal processing module is configured to generate at least an estimated channel Toeplitz matrix and an estimated signal Toeplitz matrix and wherein the cost function is derived from a composite criterion, wherein the composite criterion comprises a left unitary matrix and a right unitary matrix obtained from the singular value decomposition of the data matrix formed from the input signal.

5. The system of claim 1, wherein the receiver and transmitter each comprise 2, 4, 8, 16, 32, 64, 128, or 256 antennas.

6. The system of claim 1, wherein the number of receiver antennas is greater than the number of transmitter antennas.

7. The system of claim 1, wherein the minimization of the cost function obtains a parameter vector that is reshaped into a parameter matrix which is then used to generate the one or more Toeplitz matrices.

* * * * *